United States Patent [19]
Black et al.

[11] Patent Number: 5,351,239
[45] Date of Patent: Sep. 27, 1994

[54] DIGITAL DATA TRANSMISSION SYSTEM

[75] Inventors: David H. A. Black, Ottawa; Peter Musgrave, Montreal; Sabino R. Ventola, Woodlawn, all of Canada

[73] Assignee: Newbridge Networks Corporation, Kanata, Canada

[21] Appl. No.: 949,233

[22] PCT Filed: Mar. 15, 1991

[86] PCT No.: PCT/CA91/00079
§ 371 Date: Nov. 16, 1992
§ 102(e) Date: Nov. 16, 1992

[87] PCT Pub. No.: WO91/14319
PCT Pub. Date: Sep. 19, 1991

[30] Foreign Application Priority Data
Mar. 16, 1990 [CA] Canada .................................. 2012361
Sep. 20, 1990 [CA] Canada .................................. 2025866

[51] Int. Cl.$^5$ ............................ H04J 3/06; H04J 3/16; H04J 3/22
[52] U.S. Cl. ................................ 370/84; 370/105.4; 370/108; 370/112
[58] Field of Search ................. 370/79, 84, 85.1, 85.7, 370/94.1, 94.2, 95.1, 95.3, 105, 105.1, 105.4, 106, 108, 110.1, 110.4, 111, 112, 118, 60, 99; 375/38, 106, 112, 113, 114, 116; 358/141, 142, 146, 147

[56] References Cited
U.S. PATENT DOCUMENTS

| | | | |
|---|---|---|---|
| 3,708,783 | 1/1973 | Hedin ................................... | 371/30 |
| 4,383,316 | 5/1983 | Seidel ................................... | 370/118 |
| 4,750,171 | 6/1988 | Kedar et al. ...................... | 370/85.1 |
| 4,805,167 | 2/1989 | Leslie et al. ...................... | 370/84 |
| 4,924,459 | 5/1990 | Angell et al. ...................... | 370/84 |
| 5,065,396 | 11/1991 | Castellano et al. ................ | 370/84 |
| 5,099,475 | 3/1992 | Kozaki et al. ..................... | 370/94.1 |
| 5,103,447 | 4/1992 | Takiyasu et al. .................... | 370/84 |

*Primary Examiner*—Alpus H. Hsu
*Attorney, Agent, or Firm*—Marks & Clerk

[57] ABSTRACT

A method is disclosed for transmitting super-rate data signals having a bit-rate higher than a predetermined bit-rate through a digital data transmission system normally providing channels having the predetermined bit-rate. The channels are subject to different propagation delay characteristics through the system. The method, comprises allocating a group of k channels in the data transmission system as a virtual channel for the transmission of the super-rate signals; dividing the super-rate signals into n sub-signals, where n≦k, having a bit-rate equal to or less than the predetermined bit-rate; generating delay calibration signals for transmission through the data transmission system; defining an overhead channel in at least one of the channels; transmitting the n sub-signals over the channels; transmitting the delay calibration signals in a rotational pattern over the channels in slots normally containing data signals, the delay calibration signals temporarily displacing the data signals normally occupying the slots; transmitting the displaced data signals over the overhead channel in slots normally occupied by the delay calibration signals displacing them; and reassembling the n sub-signals to reconstitute the original super-rate data signals with the aid of the delay calibration signals after transmission through the channels.

15 Claims, 8 Drawing Sheets

DIGITAL DATA TRANSMISSION SYSTEM

BACKGROUND OF THE INVENTION

1. Field of the Invention

This invention relates to an apparatus for transmitting data over a digital transmission system having discrete data channels with a predetermined base bit-rate lower than the bit-rate of the data to be transmitted. More particularly, the invention provides a method and apparatus for allocating a number of base rate channels to a virtual channel capable of carrying signals having a bit-rate higher than the base rate.

2. Description of the Prior Art

One data transmission system to which the invention is especially applicable is the Integrated Services Digital Network (ISDN) for which the standards have been defined by the International Telegraph and Telephone Consultative Committee (CCITT). ISDN makes use of a 2.048 megabyte per second primary rate TDM channel onto which are time-division-multiplexed 32 sub-channels (DS0). Each subchannel has a base bit-rate of 64 Kb per second. The primary rate TDM channel carries 8000 frames per second, each divided into 32 time slots carrying one byte (8 bits) of data from each sub-channel. The first time slot in each frame is used to identify the start of the frame, and another time slot, which constitutes the D channel, carries routing instructions. The remaining 30 slots are available for carrying data, normally as 30 discrete channels.

The primary rate TDM channel might, for example, be used to connect a private branch exchange (PBX) to the public telephone network. A single primary rate channel will therefore give the subscriber access to thirty 64 Kbps base rate channels. Situations often arise, such as in the transmission of image and video signals, or a high volume of computer data, where it is desirable for the subscriber to transmit the data at a rate higher than the base rate. For example, it would be desirable to have the capability of sending a 128 Kbps bit stream over two parallel 64 Kbps base rate channels. Unfortunately, because of the switching requirements and propagation characteristics of the public network, a channel which occupies a particular time slot in any given frame of the transmitted signal does not necessarily occupy the same time slot at the far end. The base rate channels are subject to different delays through the network. As a result, if the channels are merely reassembled sequentially at the far end, the transmitted data is scrambled and unusable.

International Patent Application No. WO 85/04300 describes a system wherein prior to data transmission synchronization signals are transmitted along each of the base channels to determine the delays applicable to each channel. A reframer unit then takes into account these delays to reassemble the transmitted data in the correct order. The problem with this system is that once the virtual channel has been established it cannot be changed without being completely reset. Furthermore if the delays for the various channels change during transmission, the data becomes unusable. The system cannot therefore be regarded as reliable.

U.S. Pat. No. 4,805,167 describes a system for providing a variable data rate aggregate channel. In this system marker signals are sent on the base rate channels to specify the order of transmission of the sub-signals to as to ensure correct reassembly at the far end. One problem with this system is that it can only be used for packet transmission since it requires there to be idle time slots in the data channels to carry the marker signals. It cannot therefore be used with continuous signals, such as video signals because there are no vacant slots in which to insert the marker signals. Also, since the marker signals can only be inserted when idle time slots are available, it does not permit the delay characteristics of the network to be continually monitored.

An object of the invention is to provide an improved transmission system which does not depend on vacant slots being available in the data stream and which permits continuous monitoring of the channel delays.

SUMMARY OF THE INVENTION

According to a first aspect of the invention there is provided a method of transmitting signals having a bit-rate higher than a predetermined bit-rate rate in a digital data transmission system normally providing discrete data channels having said predetermined base bit-rate, said channels being subject to different propagation delay characteristics through the system, comprising allocating a group of k said predetermined bit-rate data channels as a virtual channel for the transmission of said high bit-rate signals, characterized in that an overhead channel is defined in at least one of said group of channels, said high bit-rate signals are divided into n sub-signals, where $n \leq k$, having a bit-rate equal to or less than said predetermined bit-rate, said n sub-signals are transmitted over said data channels, overhead signals are transmitted at intervals over said channels in slots normally allocated for data, said data slots being transmitted over said overhead channel while said overhead signals are transmitted in their place, and said overhead signals are used at the far end to reassemble said n subsignals into said original high bit-rate data signal.

In one embodiment, $k = n + 1$ and the extra channel is dedicated exclusively as the overhead channel.

In systems where the aggregate rate is low, the expense of a 64 Kbps overhead channel is excessive. In this case, a group of $C_0 \ldots C_{n-1}$ predetermined bit-rate data channels are allocated as a virtual channel. One of the channels $C_m$ has a free bit position not required for transmitting data and provides the overhead channel at a subrate of the predetermined bit-rate. The overhead signals are transmitted by inserting respective individual bits thereof into the respective data channels, each bit of the overhead signals being inserted into the free bit position of channel $C_m$ or into data bit positions of the other n-1 channels. The data bit that would normally be sent in a bit position occupied by an overhead signal bit is sent in the free bit position of the channel $C_m$ while its bit position is occupied by an overhead bit.

In a preferred embodiment the overhead signals, which may comprise delay calibration signals, are transmitted successively over the respective channels in a rotational pattern. For example, in the case of a virtual channel consisting of four data channels and one overhead channel, it takes successive frames to complete one rotation. In a first frame, the delay calibration signals are transmitted in the time slot corresponding to the overhead channel. In a second frame the delay calibration byte is transmitted in the time slot corresponding to the first data channel and the data that would normally be sent in that time slot is instead sent in the time slot in the overhead channel. Likewise in the third frame, data from the second channel is swapped into the overhead channel time slot and the delay calibration signal sent in its place, and so on until after the delay calibration signals have been sent in the fourth data channel the next delay calibration signals are sent in the overhead channel, whereafter the cycle is repeated.

Each data channel (DSO) may be delayed differently by the network. The delay calibration signals, hereafter referred to as delay calibration byte (DCB), form a framing pattern in each channel which can be extracted at the receiver. The contents of the DCBs permit the relative delay to be determined. In the scheme just described, every end byte on the far end channels constitutes the framing pattern. The rotating calibration scheme may be performed continuously throughout the transmission, or used initially to establish superrate transmission and then discontinued.

To determine the relative delay between channels the overhead byte sends out a rotation count (LSB). A rotation starts with a DCB sent out on the overhead channel and ends when the last data channel in the virtual channel has sent its DCB. At the receiver this creates the appearance of every (N+1)th byte on the channel forming a framing pattern.

To accommodate 48 Kbps data channels, only the six most significant data bits of each byte are used. The remaining bits are set to "1" to ensure correct 1's density on Switch 56 networks. Six bits provide 64 unique bytes for the DCBs, but since the count wraps around only half the rotation count can be resolved. One byte rotation count allows differential delays of 32 frames to be detected. Since the DCB would occur every 2N overhead slots the maximum delay resolution would be 2N×32 frames, which in practice is insufficient.

To overcome this problem, a second slot is used to send the most significant bits (MSB) of the rotation count, which results in a 12 bit delay calibration count. This permits 2048×2N frames to be resolved. In the worst case, where the channel size is three (N=3) this results in 12,228 frames, which is equal to 1.528 seconds. This is sufficient for mixed terrestrial satellite networks.

The overhead slots are used for the LSB count, the MSB count and general purpose overhead information. The LSB appear every second overhead slot. The slots not used for LSB alternate sending the MSB and an overhead byte. The MSB follows even LSB counts and the OHB (overhead byte) slot follows odd LSB slots.

Another aspect of the invention provides an apparatus for transmitting signals having a bit-rate higher than a predetermined bit-rate rate in a digital data transmission system normally providing discrete data channels having said predetermined base bit-rate, said channels being subject to different propagation delay characteristics through the system, comprising means for allocating a group of k said predetermined bit-rate data channels as a virtual channel for the transmission of said high bit-rate signals, an overhead channel being defined in one of said channels, means for dividing said high bit-rate signals into n sub-signals, where n≦k, having a bit-rate equal to or less than said predetermined bit-rate, means for transmitting said n sub-signals over said n data channels, means for transmitting overhead signals at intervals over said channels, the overhead being transmitted in said data channels in slots normally allocated for data, said data slots being transmitted over said overhead channel while said calibration signals are transmitted in their place, and means at the far end for using said delay calibration signals to reassemble said n subsignals into said original high bit-rate data signal.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

The invention will be described with reference to an ISDN network having a primary rate TDM carrier of 2.5048 Mb per second carrying thirty data channels and two system channels. As discussed above the primary rate channel carries 8000 frames per second, each base channel (DSO) having a base rate of 64 Kb per second.

Figure 1A:
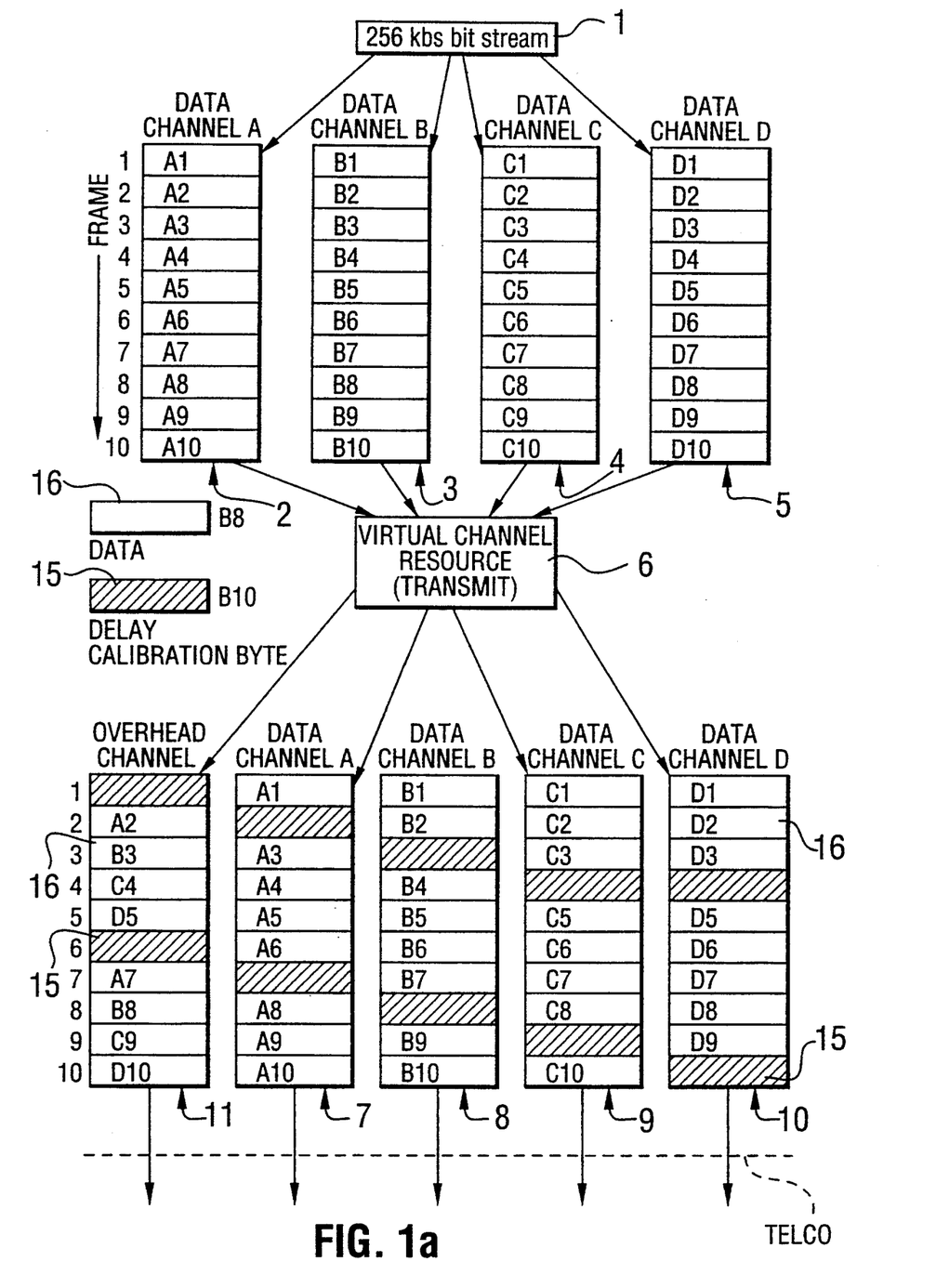
FIGS. 1a and 1b are a schematic diagram of a virtual channel operating in accordance with the invention.
Figure 1B:
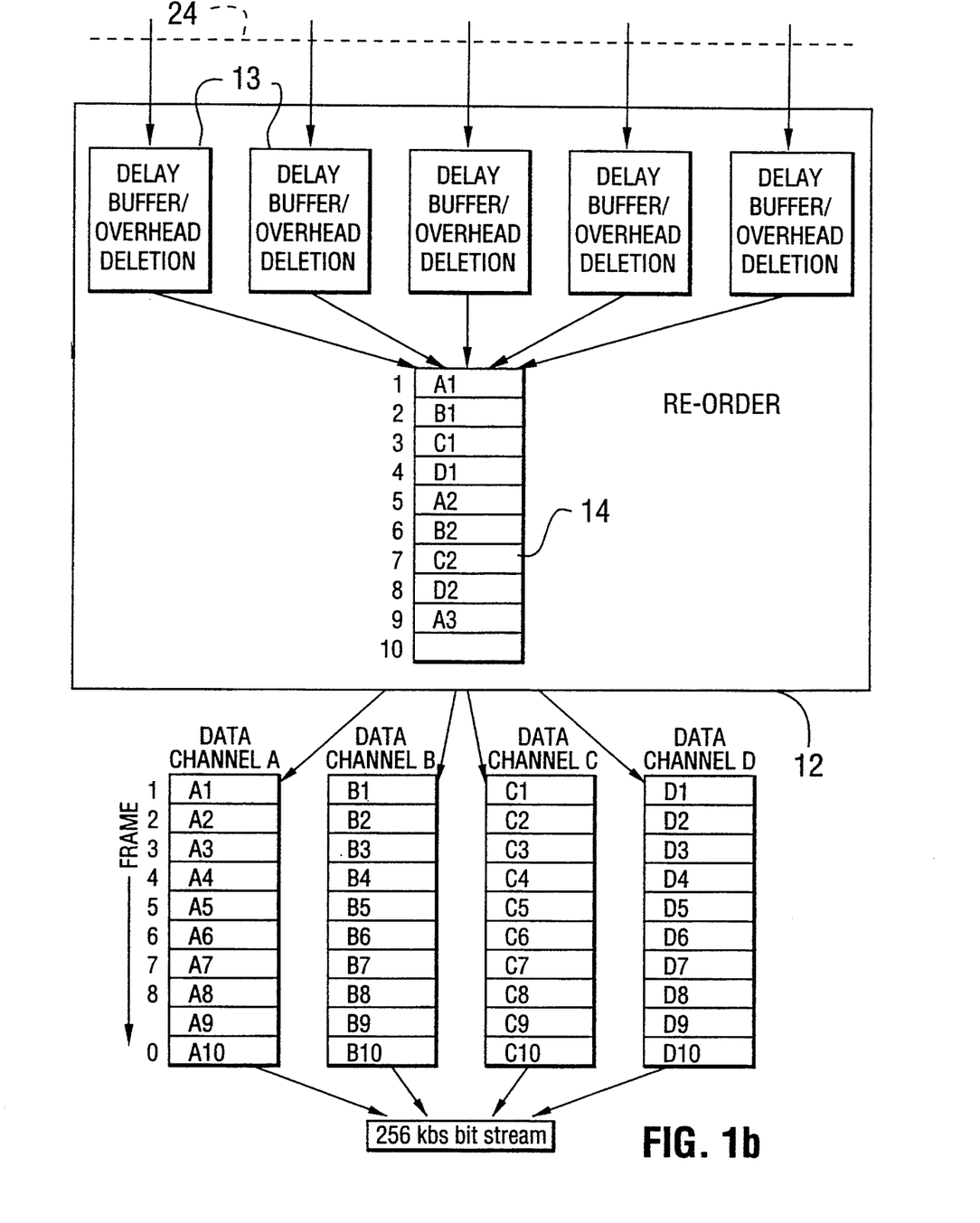
Figure 1C:
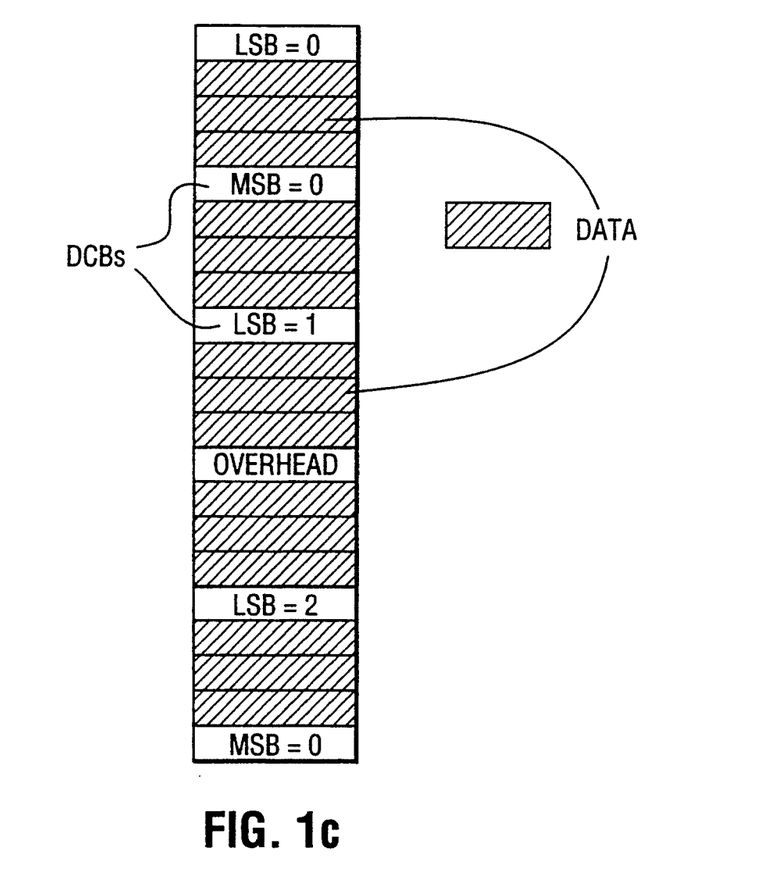
FIG. 1c shows the scheme for sending DCBs in the successive time slots of a single DSO data channel.

FIGS. 1a and 1b show respectively a transmit section and a receiver section in communication through a public telephone network. It should be noted that while for convenience the two sections are designated as the transmitter and receiver respectively, the system operates in the full duplex mode. The system is symmetrical and either section can serve as transmitter or receiver.

A 256 super-rate Kbps bit stream 1 is divided into four parallel bit streams 2, 3, 4, 5 each running at 64 Kbps (256÷4=64). The four bit streams 2, 3, 4, 5 are applied to a Virtual Channel Resource (VCR) unit 6, in the transmit section, which outputs four base rate bit streams 7, 8, 9, 10 serving as data channels and an additional base rate bit stream 11, which normally serves a data channel, but which in the virtual channel scheme serves as an overhead channel.

Figure 3:
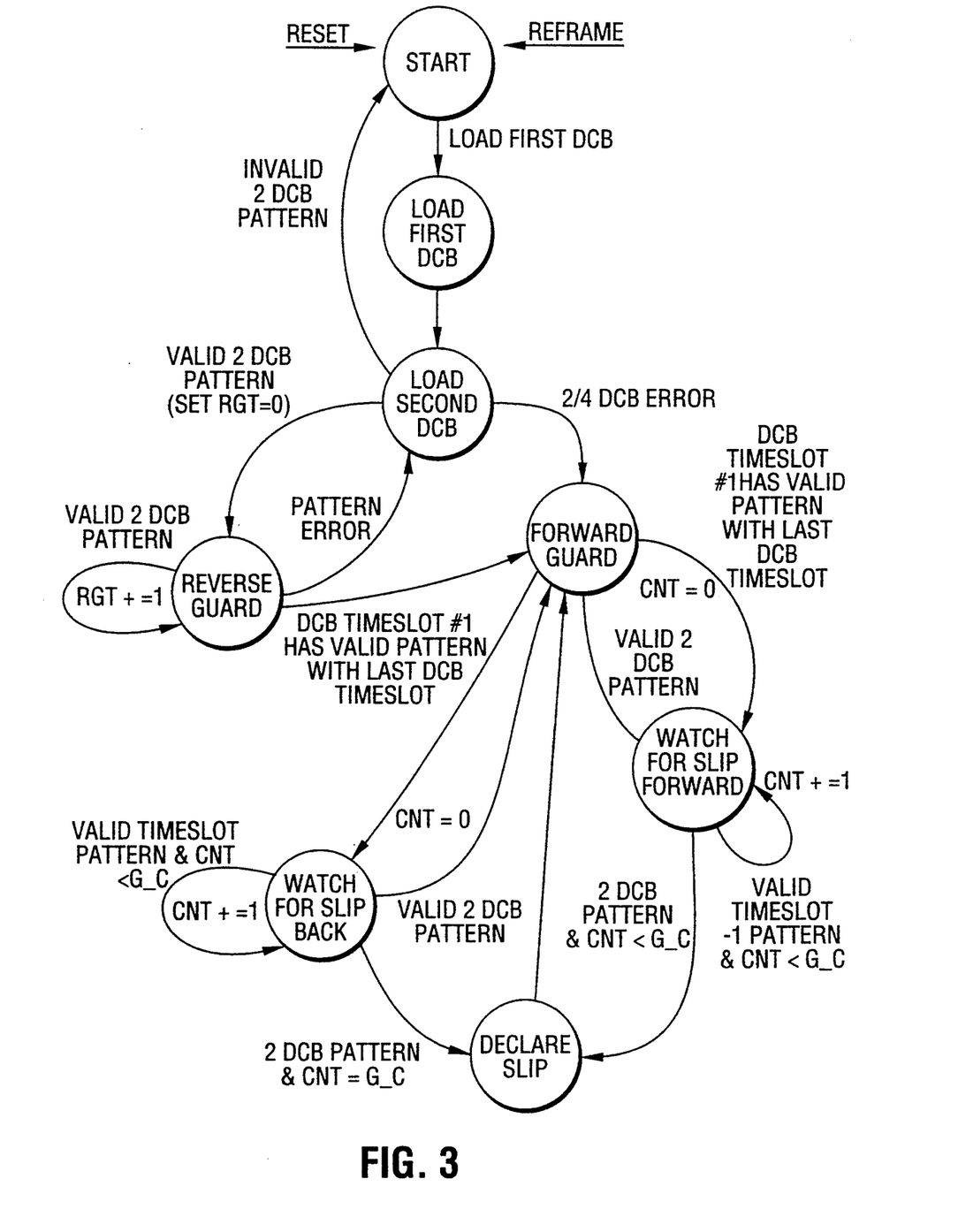
FIG. 3 is a flow chart illustrating the operation of a frame state unit.

The five base rate bit streams are transmitted over five base rate (DSO) channels on the public telephone network to a Virtual Channel Resource (VCR) unit 12 in the receiver section. VCR unit 12 includes delay buffers 13 respectively receiving each of the incoming channels and a reframer unit 14 for reassembling the incoming bytes in their proper sequence so as to reconstitute the four original bit streams as 2', 3', 4', 5'. FIG. 3 is a flow chart showing the operation of the receiver framing unit 14.

The reconstituted bit streams are then recombined into the original 256 Kbps super-rate bit stream.

The VCR transmit unit 6 inserts delay calibration bytes (DCB) 15 among the data bytes 16 according to the scheme shown. In frame 1, the first delay calibration byte (DCB) is inserted into the time slot corresponding to the overhead channel. In the next frame, the DCB is inserted in the time slot corresponding to the first data channel 7 and the contents of this time slot are transmitted in the time slot corresponding to the overhead channel. In frame 3 the contents of the time slot corresponding to the second data channel 8 are transmitted in the overhead channel, and the DCB is transmitted in this time slot. The scheme is repeated in the third and fourth data channels 9 and 10, whereafter in the sixth frame the DCB is transmitted in the overhead channel time slot, and the pattern is repeated on a rotational basis.

FIG. 1b shows how the bytes constituting the DCBs (LSBs, MBs, and OHBs) are sent successively in the DCB slots of a single DSO channel. The first LSB, representing the rotation count, is sent in the first DCB slot. There then follows three regular data slots followed by the MSB in the next DCB slot. The next DCB slots contain successively the LSB=1 byte, the OHB, the LSB=2 byte and the next MSB.

Figure 2:
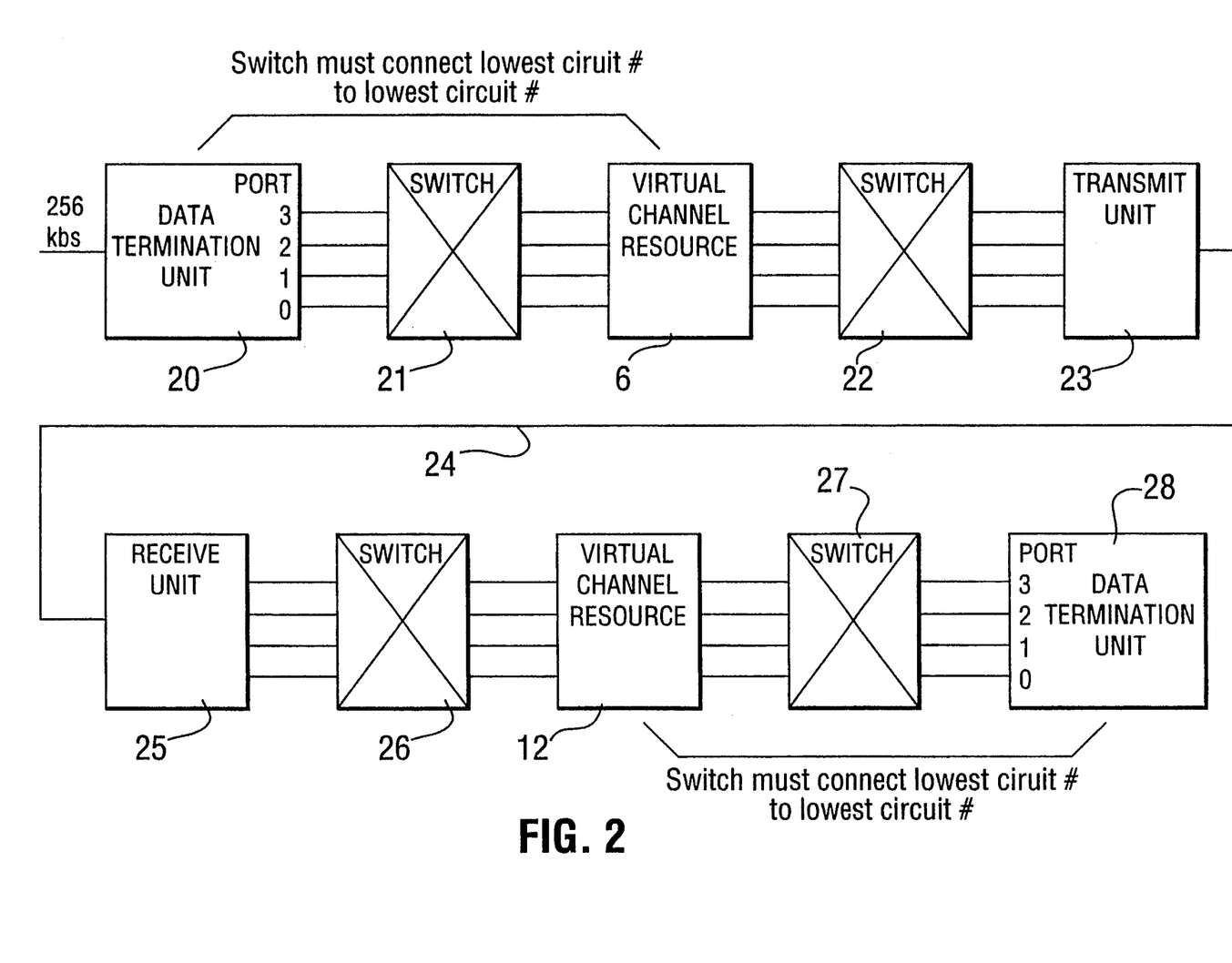
FIG. 2 is a block diagram of a data transmission system incorporation a virtual channel in accordance with the invention.

FIG. 2 shows the hardware implementation of the virtual channel. Data Termination Unit (DTU) 20 of the transmit section T receives the incoming super-rate bit stream at 256 Kbps and outputs four parallel 64 Kbps bit streams on ports 0, 1, 2, and 3. These bit streams are connected by switch 21 to the Virtual Channel Resource (VCR) transmit unit 6 in such a way that the lower circuit number on the data transmission unit 20 is connected to the lower circuit number at the input of the VCR transmit unit 6. The VCR transmit unit 6 outputs five channels (four data channels+one overhead channel) to switch 22, which is in turn connected to the line termination transmit unit 23. This is connected via a time division multiplex line 24 forming part of the public digital transmission network to the line termination receiver unit 25 of the receiver section R. The receiver unit 25 outputs five channels (including the overhead channel) to the switch unit 26, which is connected to the VCR receiver unit 12. This extracts the overhead information and outputs four data channels to the switch unit 27. The switch 27 connects the lower incoming circuit number from the virtual channel resource receiver unit 12 to the outgoing lowest circuit number on the DTU 28. This in turn outputs the original super-rate 250 Kbps bits stream.

Although the invention has been described in connection with a 64 Kbs base rate network, in order to accommodate 48 Kbps data channels, which are used in some countries such as the United States, only the six most significant data bits of each byte can be used according to the scheme described above.

A rotation starts with a DCB sent out on the overhead channel 11 and ends when the last data channel 10 in the virtual channel has sent its DCB, i.e. at frame 5 in FIG. 1. At the receiver R this creates the appearance of every Nth channel forming a framing pattern.

The Overhead Bytes (OHB) are described below. As discussed above, these are sent in the DCBs alternating with the LSB rotation counts. The slot following rotation count LSB=0 is used for rotation count MSB and may not be used for overhead information.

The Overhead Bytes are six bits to allow for 48 Kbps transfer. Overhead information is sent via a one or two byte pattern. The OHBs are described below. The unused bits are set to 1 to comply with Switch 56 ones density requirements. The overhead bytes consist of:.

Status Words

These are used to advise the sender of the status of an incoming virtual channel.

| 00abcd11 | Channel Status Word |
| | a = virtual channel synch (1 = in synch) |

-continued

| | b = virtual channel state bit 1 |
| | c = virtual channel state bit 1 |
| | d = data synch (1 = in synch) |
| State | Virtual Channel State |
| 00 | In Service |
| 01 | Calibrate and leave |
| 10 | Out of Frame |

Channel ID Bytes

These are used to indicate the channel/virtual channel numbers of the transmitted virtual channel (VC) to the receiver.

| 01nnnn11 | nnnnn = | 0 following byte is channel #LSB |
| | | 1 following byte is channel #MSB |
| | | 2 following byte is VC #LSB |
| | | 3 following byte is VC #MSB |
| | | 4 channel mode = start up mode |
| | | 5 channel mode = continuous mode |
| | | 6 channel mode = transparent mode |

The following overhead byte codes may only be sent in the overhead channel (channel number 0):

| 10nnnn11 | nnnn = 0 | overhead channel message start |
| | | 1 overhead channel message end |
| 11abcd11 | abcd = > | ABCD signalling bits |

In a given 100 ms interval each channel must send the OH bytes listed below one or more times.
channel status word
channel number
virtual channel number
channel mode Overhead channels in message mode are exempt from this requirement.

In order to correct delay at the receiver the sequence in which the rotation count is sent and the assignment of channel number to circuit numbers must be known by the receiver. The channel rotation count is sent first on the overhead channel and then on the data channels in order of increasing channel number. The channel numbers are assigned to the sender data circuits in the following fashion, which is given by way of example with reference to a Newbridge 3645 Mainstreet system. The channels must be numbered in some fixed manner which is the same at each end:

in an ST-BUS the earlier timeslots get the lowest numbers in MX streams simultaneous ST-BUS timeslots are ordered by PE slot number in MX links the timeslots are ordered D1<D2<CB-1<CB2

This protocol requires that data circuits from the data source (DTU) 20 to VCR transmit unit 6 be mapped in the same fashion as the circuits from the VCR receive unit 12 to data receiver unit 28. Switches 21, 22, 26, 27 bring this about, and this arrangement ensures that data interface ports are properly connected.

The circuits between the VCRs need not be consistently mapped. The VCR receive unit 12 will determine the channel number assignments and send the data out in increasing timeslot order on the data circuits to the data receiver. This allows independence of the network.

In the continuous calibration mode, discussed below, the overhead channel (channel number 0) may be used to send messages from end to end. The messages are sent in the overhead DCB slots following an overhead channel message start byte pattern. The overhead channel on byte pattern is repeated 10 times before the message channel is active. Once the channel is active a message of not more than 128 bytes may be sent. The message is terminated by sending overhead channel message end byte (repeated 10 times). While the overhead channel is active no other messages may be sent on channel 0.

The overhead message packets are not defined. Any suitable packet based protocol can be used to send messages. They are used for messages for:

Performance summary (slips, LSB count errors etc.)
Dynamic channel sizing

In order to accommodate a variety of network types several modes exist. All of these modes assume that the virtual channel is full duplex. The channel mode is sent in overhead bytes in all channels. Examination of any one channel is sufficient for determining the mode. The mode should be debounced for 4 super-rotations.

1. Continuous Calibration Mode

Data and DCB patterns are inserted at start-up and continued for the life of the channel. For transport of N data channels N+1 circuits between VCRs must be allocated. The overhead channel should be used to continuously send the following information:

Channel Number (LSB & MSB)
Virtual Channel Number (LSB & MSB)
Data Channel Status
Continuous Mode Channel 2. Start-up Calibration Mode Only This mode exists to allow overhead-free transmission of super-rate data following initial set-up. In this case for N data circuits only N inter-VCR circuits are required. These channels are numbered from 1 to N. This mode starts with the transmission of the standard rotating DCB pattern. The overhead DCBs send (continuously):

Start-Up Mode Channel
Channel Number LSB
Channel Number MSB
Far End Channel Data Status
Far End Virtual Channel Status To simplify framing at the far-end all ones are sent in place of data. Once the receiving VCR has framed and extracted the necessary information from the overhead bytes, it sends a data synch=1 in its Channel Status Word, and virtual channel synch=1 and state=In Service in the Virtual Channel Status Word.

The sending VCR upon receipt of virtual channel synch sends a transfer to transparent signal in the data status word of channel 1. This signal consists of 8 repetitions of the Data Status Word in successive OH bytes with mode set to Transparent. Once the signal is complete the sender then shifts to transparent mode.

3. Transparent Mode

This mode allows for direct super-rate virtual channel connection without continuous delay calibration. This mode can be started immediately, or entered after a delay calibrating start-up sequence. While in the transparent mode the receiver continues to monitor for a framing pattern. If framing is detected and maintained for 500 ms on all of the channels forming a virtual channel then the receiver change modes to correspond to the mode type in the data status word of the incoming data.

Ideally the maximum reframe time for a single DSO within a virtual channel should be 500 ms, so the maximum time to re-calibrate an entire virtual channel would be 2.5 secs. The maximum time to correct a frame slip on a DSO would be 100 ms. For large values of N, these targets may not be attainable.

Channel Operation

In normal operation each channel sends data status and virtual channel overhead bytes. During start-up the channel watches for far end Virtual Channel synch. If synch is not received within 10 secs, a recovery signal is broadcast. If VC synch is received within 10 secs the channel declares In-service and continues monitoring or moves to the transparent mode.

In the event of a data channel out-of-frame the receiver sends an out-of-synch signal in the channel status byte and all other channels within the virtual channel send Virtual Channel Out-of-Synch (VCOS) in their virtual channel status words. If VCOS is detected in the incoming streams and persists for 5 secs, the sender declares Far-End-Out-Of-Frame and enters the recovery mode. If the receiver cannot frame on the incoming stream within 5 secs, it declares Near-End-Out-Of-Frame and continues to maintain far end alignment.

Figure 4:
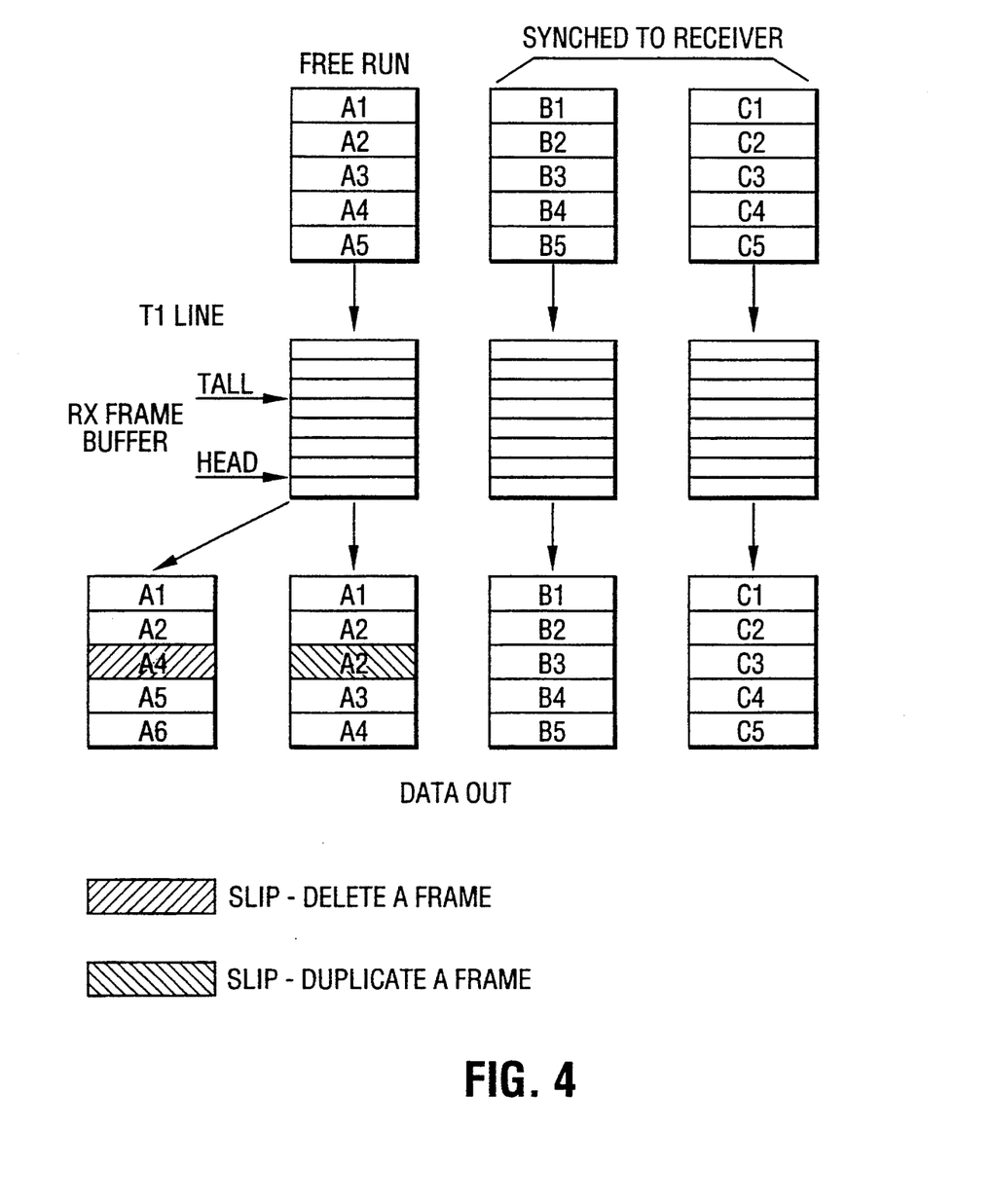
FIG. 4 is a diagram illustrating the consequences of a base channel slipping within a virtual channel.
Figure 5:
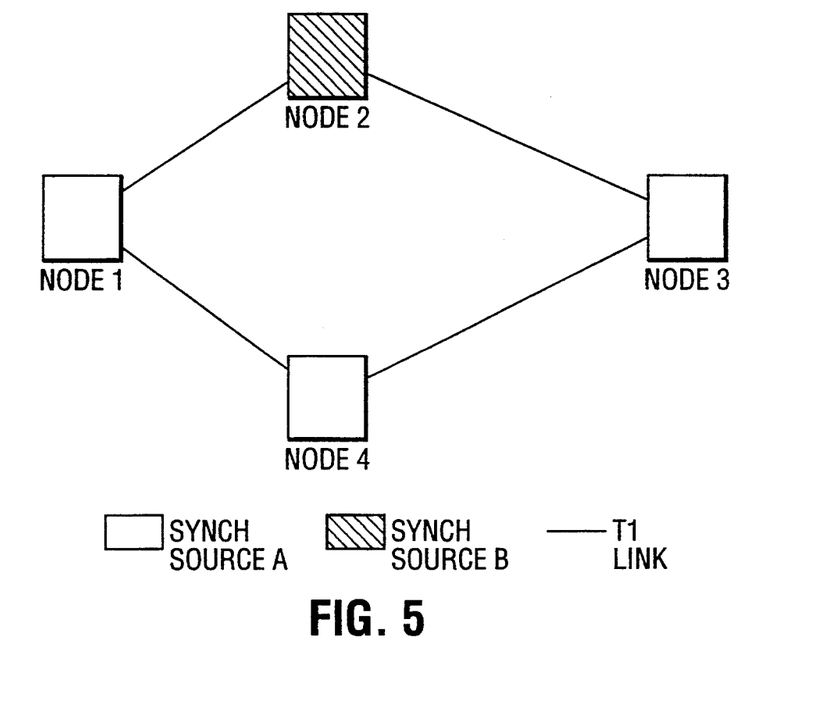
FIG. 5 is a simplified block diagram of a four-node transmission network.
Figure 6:
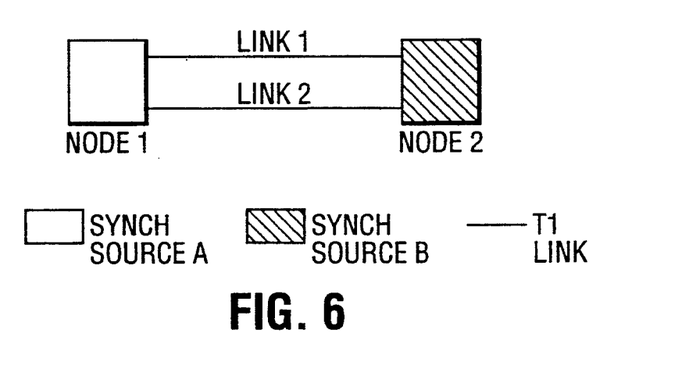
FIG. 6 is a block diagram of two-node network.

Frame slips occur as a result of asynchronism between network elements. A frame slip will result in either the duplication of deletion of a frame of information within the transmission facility. If a single channel within a virtual channel slips then it will become permanently misaligned with the other members of the virtual channel as shown in FIG. 4. In the virtual channel information the data all starts within one synchronization domain. This leads to two slip scenarios:

phase error slips due to an asynchronous network span
continuous slips due to different network synch sources The phase error slip case results in a maximum delay adjustment of $+/-1$ frame. In FIG. 5, which relates to the four node case and FIG. 6, which relates to the two node case, node 2 runs slightly slower than the network. Data from 1→2 arrives too quickly and the receiver must periodically throw away a frame of data. At the 2→3 interface data is arriving too slowly and a frame must be duplicated occasionally to correct. The net effect on the channel is that it will periodically slip in one direction and then eventually slip back. Each time the slip occurs the delay of the affected channel must be changed.

In the continuous slip case, slips occur in one direction only. The slips on links A & B will be out of phase. If an attempt is made to compensate by changing delay on the channel which slips, then as slips accumulate so will the delay. Eventually the buffer space for delaying will be exhausted and it will be necessary to disrupt service to re-calibrate. One solution, provided a knowledge of network topology is available, is to add a delay to channel 1 when link 1 slips and remove the delay from channel 1 when link 2 slips, in which case the need to re-calibrate can be avoided.

A frame slip will misalign data on the virtual channel. The slips should be detected and corrected quickly. At the receiver the framing pattern will slip, and the framer must cope with slips without declaring out-of-frame.

The receiver framing operation will now be described in more detail. At the base-rate channel (DSO) level the rotating DCB pattern appears as a DCB every N frames. This allows each DSO to be considered as an independent channel which must frame on the incoming DCB pattern. Delay equalization is then performed by reading the current DCB count and the byte offset from it from each DSO in a known time-sequence. This allows the relative delay between the DSO to be calculated and the variable delay buffers changed. It is permissible to allow the DSOs to reframe as a consequence of delay adjustment provided that the performance objectives are met.

The start-up time and the recovery time from protection switches depends on the time it takes the receiver to frame on each DSO in the virtual channel. The frequency of delay calibration bytes is a function of the virtual channel size. As the frequency of DCBs decreases reframe time increases.

The VCR state framer, for which the flow chart is shown in FIG. 3, handles slips without re-framing to allow very fast slip response time. In the start state the framer selects a byte from the data stream and moves to the Load First DCB state. N data bytes later the second DCB is loaded on the transition Load Second DCB state. If the two DCBs form a valid pattern (the second is one more than the first) then the Reverse Guard state is entered (Note: if the first DCB was 0 then the following DCB is a MSB and the one after that is an overhead byte, in this case a valid pattern cannot be declared until the next LSB rotation count is examined). From Reverse Guard the pattern is checked until GUARD-COUNT correct DCBs have been detected at which point an in-frame is declared and the Forward Guard state entered. A 2/4 DCB error causes loss of frame and transition to Load Second DCB. In addition to looking in the expected timeslots, the forward guard state examines the timeslot on either side. If a valid pattern is detected between the previous timeslot DCB and one on either side of the present DCB then a Watch for Slip state is entered. If GUARD-COUNT valid DCB bytes are observed in the $+/-$ 1 timeslot then slip is declared, the timeslot for examining framing is moved and SLIP is declared. If 2/4 DCB error in timeslot $+/-$ 1 are encountered in one of the Wait For Slip states then the Load Second DCB state is entered.

The parameter GUARD-COUNT is a feature of the framer. It should be adjustable on a per Virtual Channel Resource level. The ability to adjust GUARD-COUNT on a per virtual channel basis is desirable, but not required. The frequency of DCB bytes (rotation time) is $N \times 125$ μsec. This time is calculated for various channel sizes in the table below:

| N | Rotation Time | Super-Rotation Time |
|---|---|---|
| 8 | 1 ms | 256 ms |
| 16 | 2 ms | 512 ms |
| 32 | 4 ms | 1024 ms |
| 64 | 8 ms | 2048 ms |
| 128 | 16 ms | 4096 ms |
| 256 | 32 ms | 8192 ms |

The overhead frequency is $2 \times$ Rotation Time. The framer slip detection depends on the size of channel and the framer parameter GUARD-COUNT. Some times for various values of parameters are indicated below:

| N | G C | Slip Response |
|---|---|---|
| 8 | 4 | 10 ms |
| 8 | 8 | 18 ms |
| 32 | 4 | 20 ms |
| 32 | 8 | 36 ms |
| 256 | 2 | 192 ms |
| 256 | 4 | 320 ms |
| 256 | 8 | 576 ms |

These numbers assume GUARD-COUNT+1 rotation count LSBs are required for declaration of slip. Time to implement the delay adjustment is not included.

In systems where the aggregate rate is low, the expense of a 64 Kbps overhead channel is excessive. In accordance with the embodiment shown in FIG. 7, the overhead channel is formed by inserting overhead bits into data (DSO) channels and temporarily inserting the data bits normally occupying the bit positions into a spare bit position in one of the data channels.

Figure 7:
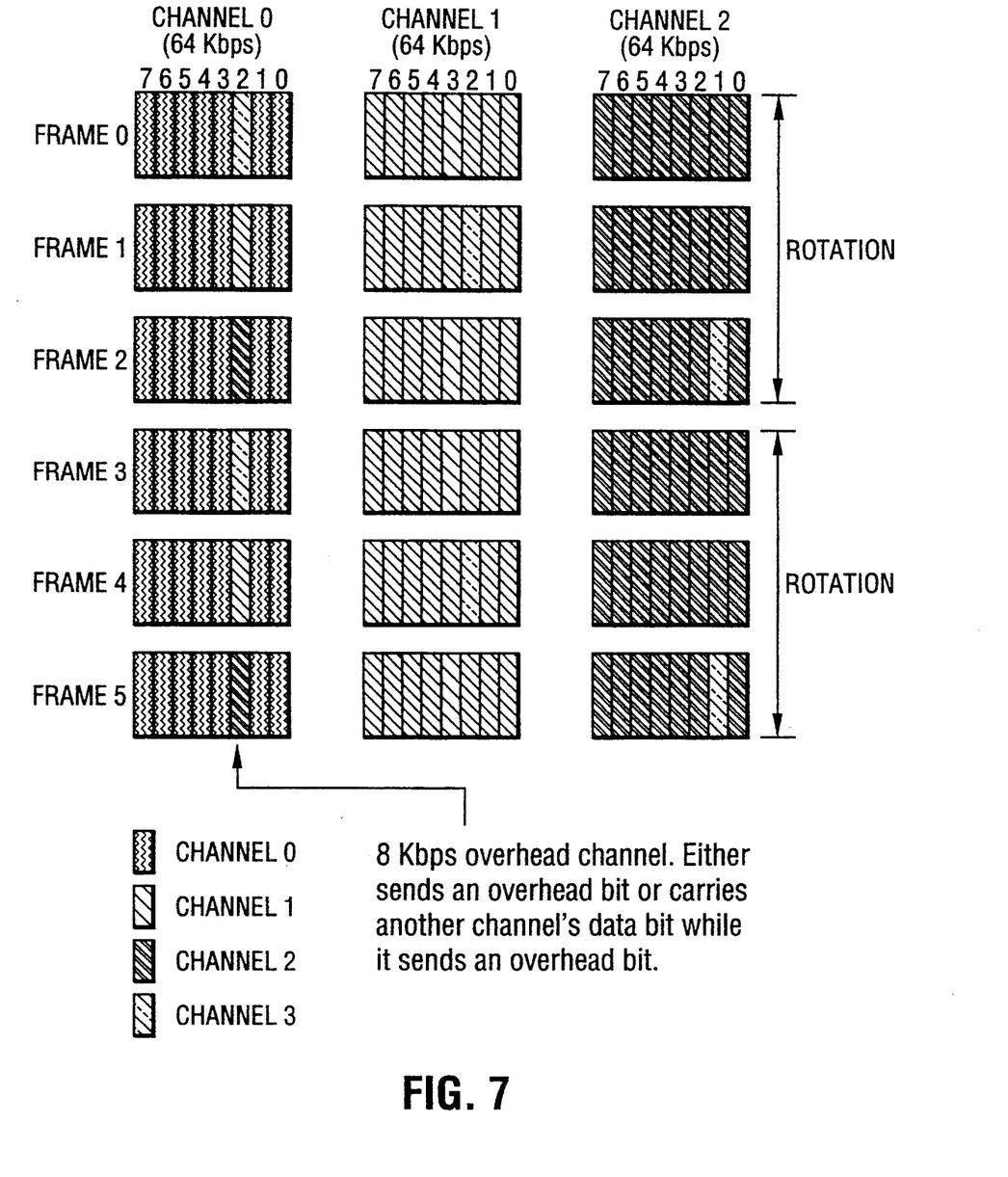
FIG. 7 is a diagram showing the transmission scheme in accordance with a second embodiment of the invention, where the overhead channel is defined by a vacant bit position within a data channel.

Referring now to FIG. 7, this shows an 8 Kb per second virtual channel protocol. Each channel has eight bits, numbered 0 to 7, with 7 being the first bit time slot (this is different from conventional telecompactors, where the bits are numbered 1 to 8, with 1 as the first time slot).

FIG. 7 shows three channels $C_0$, $C_1$, $C_2$, which are to be used for super-frame transmission. Each channel is a 64 Kbps DSO base rate channel, and the channels are time division multiplexed in a known manner. In order to transmit data through the virtual channel at a bit rate higher than the bit rate of DSO channels (super-frame transmission), overhead information has to be transmitted through the network in an overhead channel. This is an 8 Kbps virtual channel formed by substituting overhead bits in predetermined bit positions in rotation in the data channels.

As shown in FIG. 7, in frame 0 overhead bit 1 is inserted in bit position 2 of channel $C_0$. Channel $C_1$ and $C_2$ are unaffected. In frame 2, the data bits 2 that would normally be transmitted in bit position 2 of channel $C_1$ is transmitted in bit position 2 of channel $C_0$ while the overhead bit 1 is temporarily substituted. Channel $C_2$ is unaffected. In the next frame data bit 3, that would normally be located in bit position 2 of channel $C_2$ is inserted in bit position 2 of channel $C_0$ while overhead bit 1 is inserted in its corresponding position in channel $C_2$.

This rotational sequence then continues, the substitution of the overhead bits thus allowing the formation of an overhead channel within the data channels without the need to use a separate data channel for overhead purposes. The effect on any given channel therefore is the appearance of overhead bits every third byte. In the more general case, where N channels are aggregated, the overhead bit will appear every $N^{th}$ byte. Six types of overhead bits exist as follows:

framing bits
delay calibration timestamp bits
status bits
mode bits
super-frame bits The format of these bits will now be described in more detail as follows:

Framing Structure

The VCP8 super frame is shown below:

MD <d> F1 <d> DC5 <d> F0 <d> CID5 <d> F0 <d> ST5 <d> F1 <d>

*-continued*

```
MD <d> F1 <d> DC4 <d> F0 <d> CID4 <d> F0 <d> ST4 <d> F1 <d>
MD <d> F1 <d> DC3 <d> F0 <d> CID3 <d> F0 <d> ST3 <d> F1 <d>
MD <d> F1 <d> DC2 <d> F0 <d> CID2 <d> F0 <d> ST2 <d> F1 <d>
MD <d> F1 <d> DC1 <d> F0 <d> CID1 <d> F0 <d> ST1 <d> F1 <d>
MD <d> F1 <d> DC0 <d> F0 <d> CID0 <d> F0 <d> ST0 <d> F1 <d>
``` where
- $<d>$ represents N-1 frames of data bits.
- Fx—framing bit (value=x)
- SFx—super frame bit (value=x)
- DCn—bit n of delay calibration timestamp
- CIDn—bit n of the channel ID
- STn—bit of the status word
- MD—is the channel mode (0=transparent, 1=monitor)

The super frame consists of six frames, each consisting of eight overhead bits. four of these overhead bits form the basic 1001 framing pattern. The remaining four bits per frame are used to carry status signals. Since four bits per frame is not enough to carry the required overhead information a group of six frames are used to construct a super-frame. The super-frame alignment bits are carried in the first column of the super-frame.

Delay Calibration Timestamp

Each super-frame carries a (Delay Calibration Timestamp) DCT. The source of the virtual channel protocol sends a continually incrementing 6 bit value in this field. The DCT value is incremented after each super-frame of overhead has been sent.

The delay resolution provided by this mechanism is a function of virtual channel size. This will be discussed further in the performance estimates section.

Channel ID

The channel ID field provides a 6 bit channel identifier, which results in a maximum virtual channel size of 64.

Status Word

The six bit status word is defined as:

| | | |
|---|---|---|
| bit 5 | Signal Bit D | |
| bit 4 | Signal Bit C | |
| bit 3 | Signal Bit B | |
| bit 2 | Signal Bit A | |
| bit 1 | Virtual Channel Synch (VSYNCH) 1 = in synch | |
| bit 0 | Channel Data Synch (DSYNCH) 1 = in synch | |

DSYNCH—each channel in the Virtual channel will use the DSYNCH bit to send its framer status to the far end. If it is In Frame it will set DSYNCH=1, otherwise DSYNCH=0.

VSYNCH—each channel in the virtual channel will send VSYNCH=1 if the virtual channel is In Service. An In Service Virtual Channel is defined as one for which:
- all channels have data synch
- all delay calibration has been performed Signalling bits are defined only for the channel with the lowest channel number in a virtual channel group (typically channel 0). The signalling bits on other channels in the group are undefined.

Far End Status

Far end data synch is known from the DSYNCH bit directly

Far Enc Virtual Channel Synch is assumed if ALL channels send VSYNCH.

If channels are out of frame at the near end then their status bits cannot be extracted and should be ignored. The remaining VSYNCH bits are used to determine the status of the virtual channel. If a channel shows VSYNCH for 10 ms then it can be declared In Service.

Delay Determination

The receiver can determine the relative delays between channels by keeping the following information:
- DCT count from past super-frame
- frame offset from the beginning of the present super-frame
- channel ID The DCT difference can only be resolved to half of the DCT size (due to wrap-around). Prior to performing any calculations the list of DCT sizes should be scanned in ascending order until a difference of greater than or equal to 32 is found. The DCT number should then be renormalized to remove the wrap-around.

The differential delay between two channels A and B where $DCT_A > DCT_B$ is:

$$(DCT_A - DCT_B) \times 30N + OFFSET_A - OFFSET_B + CID_A - CID_B$$

This expression provides the amount that B must be delayed to equalize it with A. Conceptually the difference in DCT gives us the number of super-frames apart, the offset gives us number of frames apart and then we need to correct for the difference in channel numbers (since the overhead on channel 0 appears a frame before that on channel 1 etc.).

In equalizing delays it is first necessary to find the slowest channel (the one with the largest value of DCB+OFFSET−CID). This channel's delay buffer is then set to zero and the delay of all other channels determined relative to the slowest one.

In order to respond to frame slips it is desirable to set the slowest channels delay buffer to some small non-zero value. This permits slip handling of the channel. The choice of this value is implementation dependent, since it impact buffer size. In networks which slip repeatedly this space will eventually be exhausted and then a complete re-calibration will be required.

Circuit—Channel Number Mapping

In order to correct delay at the receiver the sequence in which the rotation count is sent and the assignment of channel numbers to circuit numbers must be known by the receiver.

The channel rotation count is sent first on the overhead channel and then on the data channels in order of increasing channel number.

The channel numbers are assigned to the sender data circuits in the following fashion:

in an ST-BUS the earlier timeslots get the lowest numbers in MX streams simultaneous ST-BUS timeslots are ordered by PE slot number in MX links the timeslots are ordered D1<CB1<D-2<CB2

This protocol requires that data circuits from the data source to virtual channel resource be mapped in the same fashion as the circuits from the receiver VCR to data receiver. This ensures that data interface ports are properly connected.

The circuits between VCRs need not be consistently mapped. The Virtual Channel Receiver will determine the channel number assignments and send the data out in increasing timeslot order on the data circuits to the data receiver. This allows independence of the network.

The maximum delay resolution is a function of channel size and the number of bits used for the DCT. The worst case virtual channel is N=2.

The DCT bits occur with frequency 8N and it requires 6 frames to get a complete DCT. Due to wrap-around of the counting we can only resolve delays to one half of the maximum DCT value, or 32. The resulting resolution is:

$$8 \times 6N \times 32 \times 0.125 \, \mu s$$

For N=2 this results in delay resolution of 384 ms and for N=7, 1344 ms. This precludes mixed satellite/terrestrial applications (it's unlikely a VCR would have enough buffer space for such applications).

In the described method data can be passed through a network in which input and output channels are randomly cross-connected with different path delays and re-ordered at the receiver.

A main advantage of the system described is that the method is adaptive and will adjust for changes in delay during traffic transmission. The system also allows a high bit rate synchronous channel to detect and recover from changes in network (i.e. frame slips, protection switches) during the course of the connection and the signalling can be passed via ABCD bits in the overhead bytes.

We claim:

1. A method of transmitting super-rate data signals having a bit-rate higher than a predetermined bit-rate through a digital data transmission system normally providing channels having said predetermined bit-rate, said channels being subject to different propagation delay characteristics through said system, comprising:
    allocating a group of k said channels (where k is an integer) in said data transmission system as a virtual channel for the transmission of said super-rate signals;
    dividing said super-rate signals into n sub-signals, where n is an integer and n≦k, having a bit-rate equal to or less than said predetermined bit-rate;
    defining an overhead channel in at least one of said channels;
    transmitting said n sub-signals over said channels;
    transmitting overhead signals at intervals in said channels in slots normally containing data signals, said overhead signals temporarily displacing the data signals normally occupying said slots;
    transmitting said displaced data signals over said overhead channel in slots normally occupied by the overhead signals displacing them; and
    reassembling said n sub-signals to reconstitute said original super-rate data signals with the aid of said overhead signals after transmission through said channels:
    wherein one of the channels, which has a free bit position not required for transmitting data, provides said overhead channel at a sub-rate of the predetermined bit-rate, and the overhead signals are transmitted by inserting respective individual bits thereof on a rotational basis into the respective data channels, each bit of the overhead signals being inserted into the free bit position of said one channel or into data bit positions of the other n-1 channels, the data bit that would normally be sent in a bit position occupied by a data calibration bit being sent in the free bit position of said one channel while its bit position is occupied by an overhead bit.

2. A method as claimed in claim 1, wherein said overhead signals are sent over an 8 kbs virtual overhead channel consisting of said rotating bit positions distributed over said data channels.

3. A method as claimed in claim 1, wherein in a first frame the first overhead bit is sent in said free bit position of the first channel, in a second frame the second overhead bit is sent in a predetermined bit position of the second channel while the corresponding data bit normally sent in that bit position is sent in said free bit position of the first channel, in a third frame the third overhead bit is sent in a predetermined bit position of the third channel while the corresponding data bit normally sent in that bit position is sent in said free bit position of the first channel, and so on until an overhead bit has been substituted in all data channels, whereupon the cycle is repeated.

4. A method of transmitting super-rate data signals having a bit-rate higher than a predetermined bit-rate through a digital data transmission system normally providing channels having said predetermined bit-rate, said channels being subject to different propagation delay characteristics through said system, comprising:
    allocating a group of k said channels (where K is an integer) in said data transmission system as a virtual channel for the transmission of said super-rate signals;
    dividing said super-rate signals into n sub-signals, where n is an integer and n≦k, having a bit-rate equal to or less than said predetermined bit-rate;
    generating delay calibration signals for transmission through said data transmission system;
    defining an overhead channel in at least one of said channels;
    transmitting said n sub-signals over said channels;
    transmitting said delay calibration signals in a rotational pattern over said channels in slots normally containing data signals, said delay calibration signals temporarily displacing the data signals normally occupying said slots;
    transmitting said displaced data signals over said overhead channel in slots normally occupied by the delay calibration signals displacing them; and
    reassembling said n sub-signals to reconstitute said original super-rate data signals with the aid of said delay calibration signals after transmission through said channels.

5. A method as claimed in claim 4, wherein the delay calibration signals include rotation count bytes (LSBs).

6. A method as claimed in claim 5, wherein said rotation count bytes (LSBs) are interspersed with multi-purpose overhead bytes (OHB's) which carry overhead data for the virtual channel.

7. A method as claimed in claim 6, wherein a predetermined number of the most significant bits of the rotation count bytes (LSBs) are not used to carry rotation count information, and additional bytes, referred to as (MSBs), which are interspersed with the rotation count bytes (LSBs) and multi-purpose overhead bytes (OHBs), are used to carry the information missing from the unused bit positions of the LSB's.

8. A method as claimed in claim 7, wherein the MSBs follow even-numbered LSBs and OHBs follow odd-numbered LSBs.

9. A method as claimed in claim 7, wherein said virtual channel is established between a sender and a receiver and said multi-purpose overhead bytes comprise status words giving status information about the virtual channel to the sender, and channel id bytes indicating the channel numbers of the transmitted virtual channel to the receiver.

10. A method as claimed in claim 4, wherein $k=n+1$ and one of said channels is reserved exclusively as an overhead channel dedicated to carrying, in a rotational pattern, said delay calibration signals and said data signals displaced by said delay calibration signals.

11. A method as claimed in claim 4, wherein $k=n$, and said overhead channel comprises a sub-rate channel formed by vacant bit positions in one of said channels having said predetermined bit rate.

12. In a digital data transmission system normally providing discrete channels each having a predetermined bit-rate, said channels being subject to different propagation delay characteristics through said system, an apparatus for transmitting super-rate data signals having a bit-rate higher than said predetermined bit-rate through said channels comprising:

means for allocating a group of k said channels (where K is an integer) in said data transmission system as a virtual channel for the transmission of said super-rate signals;

means for dividing said super-rate signals into n sub-signals, where n is an integer and $n \leq k$, having a bit-rate equal to or less than said predetermined bit-rate;

means for generating delay calibration signals for transmission through said data transmission system;

means for defining an overhead channel in at least one of said channels;

means for transmitting said n sub-signals over said channels;

means for transmitting said delay calibration signals in a rotational pattern over said channels in slots normally containing data signals, said delay calibration signals temporarily displacing the data signals normally occupying said slots;

means for transmitting said displaced data signals over said overhead channel in slots normally occupied by the delay calibration signals displacing them; and means for reassembling said n sub-signals to reconstitute said original super-rate data signals with the aid of said delay calibration signals after transmission through said channels.

13. An apparatus as claimed in claim 12, wherein sending and receiving virtual channel resource units (VCRs) are provided respectively at each end of said data transmission system, said sending unit including means for inserting said delay calibration signals into said sub-signals in said rotational pattern and transferring the displaced data signals to the overhead channel, and said receiving VCR unit including a reframer to reassemble the received signals in the same order as said super-rate signal with the aid of said delay calibration signals.

14. An apparatus as claimed in claim 13, wherein $k=n+1$ and one of said channels is reserved exclusively as an overhead channel dedicated to carrying, in a rotational pattern, said delay calibration signals and said data signals displaced by said delay calibration signals.

15. An apparatus as claimed in claim 13, wherein $k=n$, and said overhead channel comprises a sub-rate channel formed by vacant bit positions in one of said channels having said predetermined bit rate.

* * * * *